(12) United States Patent
Veerasamy

(10) Patent No.: US 6,602,371 B2
(45) Date of Patent: Aug. 5, 2003

(54) METHOD OF MAKING A CURVED VEHICLE WINDSHIELD

(75) Inventor: Vijayen S. Veerasamy, Farmington Hills, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 22 days.

(21) Appl. No.: 09/793,408

(22) Filed: Feb. 27, 2001

(65) Prior Publication Data

US 2002/0117250 A1 Aug. 29, 2002

(51) Int. Cl.$^7$ .......................... C23C 16/26; C03C 27/10
(52) U.S. Cl. ................... 156/102; 156/106; 427/249.7; 427/534
(58) Field of Search ....................... 156/99, 102, 106, 156/153; 427/249.7, 307, 533, 534

(56) References Cited

U.S. PATENT DOCUMENTS

| | | |
|---|---|---|
| 3,852,136 A | 12/1974 | Plumat et al. |
| 3,881,043 A | 4/1975 | Rieser et al. |
| 4,107,366 A | 8/1978 | Rieser et al. |
| 4,109,055 A | 8/1978 | Cherenko et al. |
| 4,153,526 A | 5/1979 | Cherenko et al. |
| 4,180,426 A | 12/1979 | Oustin et al. |
| 4,210,431 A | 7/1980 | Bachman et al. |
| 4,232,080 A | 11/1980 | Orain et al. |
| 4,362,587 A | 12/1982 | Baudin et al. |
| 4,595,482 A | 6/1986 | Mintz |
| 4,704,174 A | 11/1987 | Valimont et al. |
| 5,135,808 A | 8/1992 | Kimock et al. |
| 5,268,217 A | 12/1993 | Kimock et al. |
| 5,298,048 A | 3/1994 | Lingle et al. |
| 5,443,669 A * | 8/1995 | Tunker ....................... 156/102 |
| 5,508,368 A | 4/1996 | Knapp et al. |
| 5,527,596 A | 6/1996 | Kimock et al. |
| 5,529,654 A | 6/1996 | Kavanagh et al. |
| 5,557,462 A | 9/1996 | Hartig et al. |
| 5,584,902 A | 12/1996 | Hartig et al. |
| 5,622,580 A | 4/1997 | Mannheim |
| 5,637,353 A | 6/1997 | Kimock et al. |
| 5,643,423 A | 7/1997 | Kimock et al. |
| 5,662,877 A | 9/1997 | Shibahara et al. |
| 5,665,424 A | 9/1997 | Sherman |
| 5,888,593 A | 3/1999 | Petrmichl et al. ........... 427/563 |
| 5,945,199 A | 8/1999 | Morin et al. |
| 6,002,208 A | 12/1999 | Maishev et al. |
| 6,261,424 B1 | 7/2001 | Goncharenko et al. |
| 6,368,664 B1 * | 4/2002 | Veerasamy et al. .... 427/249.15 |

FOREIGN PATENT DOCUMENTS

| | | |
|---|---|---|
| EP | 0 499 287 A1 | 8/1992 |
| WO | WO 97/45834 | 12/1997 |
| WO | WO 00/66506 | 11/2000 |

OTHER PUBLICATIONS

U.S. patent application Ser. No. 09/703,709 filed Nov. 2, 2000.
U.S. patent application Ser. No. 09/657,132 filed Sep. 7, 2000.
U.S. patent application Ser. No. 09/627,441 filed Jul. 28, 2000.

(List continued on next page.)

Primary Examiner—Michael W. Ball
Assistant Examiner—John T. Haran
(74) Attorney, Agent, or Firm—Nixon & Vanderhye P.C.

(57) ABSTRACT

A method of making a vehicle windshield. First and second flat glass sheets are bent together into a shape desired for the windshield. The bent sheets are separated, and an interlayer (e.g., PVB) positioned therebetween. After the sheets have been heat laminated to one another via the interlayer, the convex tin side of the outer sheet is ion beam milled to shave off a portion thereof. Then, a diamond-like carbon (DLC) inclusive coating is deposited using an ion beam(s) on the milled convex shaped surface of the laminate to produce a windshield. In certain optional embodiments, the windshield may be hydrophobic in nature.

18 Claims, 10 Drawing Sheets

OTHER PUBLICATIONS

U.S. patent application Ser. No. 09/617,815 filed Jul. 17, 2000.

U.S. patent application Ser. No. 09/303,548 filed May 3, 1999.

U.S. patent application Ser. No. 09/442,805 filed Nov. 18, 1999.

U.S. patent application Ser. No. 09/583,862 filed Jun. 1, 2000.

IBM Technical Disclosure Bulletin, vol. 36 No. 1, Jan. 1993 "Surface Hardening of Ceramic and Glass Materials" p. 225.

IBM Technical Disclosure Bulletin, vol. 36 No. 03, Mar. 1993 "Surface Hardening of Ceramic and Glass Materials" p. 291.

"Highly Tetrahedral, Diamond–like Amorphous Hydrogenated Carbon Prepared from a Plasma Beam Source" Weiler et al., XP 000449616, pp. 2797–2799, vol. 64, No. 21, May 23, 1994.

"Optical and Electronic Properties of Amorphous Diamond", Veerasamy et al., XP 000414263 Diamond and Related Materials, 2 (1993) pp. 782–787.

"Deposition of Carbon Films by a Filtered Cathodic Arc", Kuhn et al., XP 000413562 Diamond and Related Materials, Aug. 16, 1993, No. 10, pp. 1350–1354.

"Electronic Density of States in Highly Tetrahedral Amorphous Carbon", Veerasamy et al., XP 002041954, Solid State Electronics, vol. 37, No. 2, pp. 319–326, 1994.

"A Tablesaw Crosscut Box", Mehler, Aug. 1991, XP 000220287, pp. 73–75.

"Tribological Properties of Hard Disk Slider Overcoated After Ion Beam Texturing", Zhou et al., XP 002202872, Jul. 1997.

* cited by examiner

METHOD OF MAKING A CURVED VEHICLE WINDSHIELD

RELATED APPLICATIONS

This application is related to U.S. patent application Ser. No. 09/703,709, filed Nov. 2, 2000; Ser. No. 09/657,132, filed Sep. 7, 2000; Ser. No. 09/627,441, filed Jul. 28, 2000; Ser. No. 09/617,815 filed Jul. 17, 2000; Ser. No. 09/303,548, filed May 3, 1999; Ser. No. 09/442,805, filed Nov. 18, 1999; and Ser. No. 09/583,862 filed Jun. 1, 2000, the disclosures of which are all hereby incorporated herein by reference.

This invention relates to a method and system for making a curved laminated vehicle windshield, using an ion beam source(s) to deposit at least one diamond-like carbon (DLC) inclusive coating on a curved exterior surface thereof.

BACKGROUND OF THE INVENTION

Laminated curved vehicle windshields are known in the art. Such windshields typically include first and second curved glass sheets/substrates separated from one another by an interlayer of a material such as polyvinyl butyral (PVB). Unfortunately, conventional windshields typically are not hydrophobic in nature, and thus do not easily repel or shed rain water. Moreover, conventional windshields are often not as scratch resistant as would otherwise be desired.

Hydrophobic coatings are known in the art. However, a problem arises as to forming same on a windshield because the PVB layer of the windshield, once in place between the sheets to bond them together, cannot withstand high temperatures or else delamination may occur. Moreover, known hydrophobic coatings typically are not mechanically durable enough (e.g., scratch resistant) to withstand the punishing environments in which vehicle windshields are utilized (e.g., high speed, heat, sun, snow, rain, etc.).

It has heretofore not been appreciated by those skilled in the art how to efficiently deposit a hard/durable coating onto the exterior surface of a curved vehicle windshield.

SUMMARY OF THE INVENTION

An object of this invention is to provide a hard/durable coating on the exterior surface (or convex surface) of a laminated curved vehicle windshield or other curved substrate.

Another object of this invention is to provide a method of forming a hydrophobic hard/durable coating on the exterior surface of a vehicle windshield using a low temperature process so that an interlayer(s) located between the two glass sheets of the windshield is/are not damaged during the process of forming the coating. The coating comprises diamond-like carbon (DLC) in preferred embodiments.

Coatings herein my be hydrophobic or non-hydrophobic in different embodiments. When hydrophobic, the nature of such DLC-coated windshields may be characterized by relatively high initial contact angles θ. For example, coated windshields herein may be characterized by an initial contact angle θ (i.e. prior to being exposed to environmental tests, rubbing tests, acid tests, UV tests, or the like) of at least about 55 degrees, more preferably of at least about 80 degrees, even more preferably of at least about 100 degrees and most preferably of at least about 110 degrees.

Another object of this invention is to fulfill one or more of the above-listed objects.

In certain exemplary embodiments, this invention fulfills one or more of the above listed needs or objects by providing a method of making a curved laminated vehicle windshield, the method comprising:

providing first and second glass sheets;

placing the first and second glass sheets in juxtaposed relation with one another and heat bending the sheets together;

positioning an interlayer between the two heat bent glass sheets;

heating the glass sheets with interlayer therebetween in order to laminate the first and second glass sheets to one another via at least the interlayer, thereby forming a curved laminate including a convex surface and a concave surface;

ion beam milling the convex surface of the curved laminate in order to shave off or remove a portion of the first glass sheet thereby forming a milled convex surface of the curved laminate; and ion beam depositing a diamond-like carbon (DLC) inclusive coating on the milled convex surface of the curved laminate using a non-focused ion beam, thereby forming a vehicle windshield having an outer or convex surface including a DLC inclusive coating thereon.

Certain other embodiments of this invention fulfill one or more of the above-listed objects by providing a method of making a curved coated article, the method comprising:

providing a glass sheet;

heat bending the glass sheet to form a bent glass sheet having a convex surface and a concave surface; and ion beam depositing a diamond-like carbon (DLC) inclusive coating on the convex surface of the bent glass sheet.

This invention will now be described with respect to certain embodiments thereof, along with reference to the accompanying illustrations.

IN THE DRAWINGS

DETAILED DESCRIPTION OF CERTAIN EMBODIMENTS OF THIS INVENTION

Figure 1:
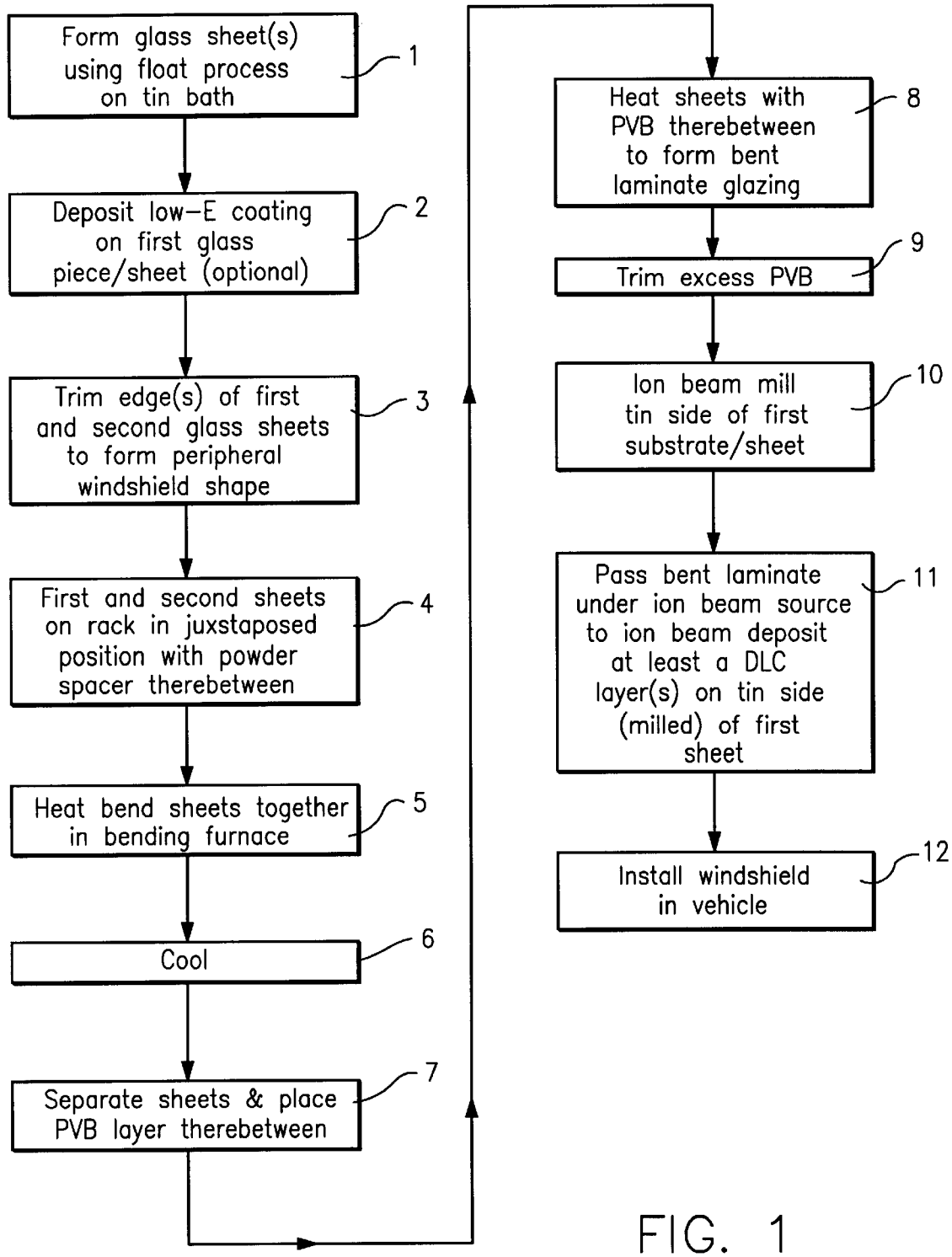
FIG. 1 is a flowchart illustrating certain steps taken in accordance with an embodiment of this invention.

Referring now more particularly to the accompanying drawings in which like reference numerals indicate like elements throughout the accompanying views.

This invention relates to a method of making/manufacturing a curved article, such as a curved laminated vehicle windshield. Curved laminated windshields according to this invention include first and second curved/bent glass sheets laminated together and sandwiching an interlayer (e.g., of or including PVB) therebetween. The exterior convex surface of the curved laminate is then passed under an ion beam source(s) in order to: (i) ion beam mill the convex surface, and/or (ii) deposit a diamond-like carbon (DLC) inclusive coating on the convex surface. Surprisingly, it has been found that the techniques utilized herein enable this coating to be ion beam deposited onto a curved substrate so that the coating has a substantially uniform thickness (i.e., the same thickness plus/minus 10%, more preferably within 5% of the same thickness, and most preferably within 3% of the same thickness) throughout its entire surface area, even given the curved nature of the article. In certain exemplary embodiments of this invention, the DLC inclusive coating may be hydrophobic and thus be characterized by a relatively high initial contact angle θ.

Referring to FIGS. 1–14, an example of this invention will now be described where a curved laminated vehicle windshield is made.

Figure 2:
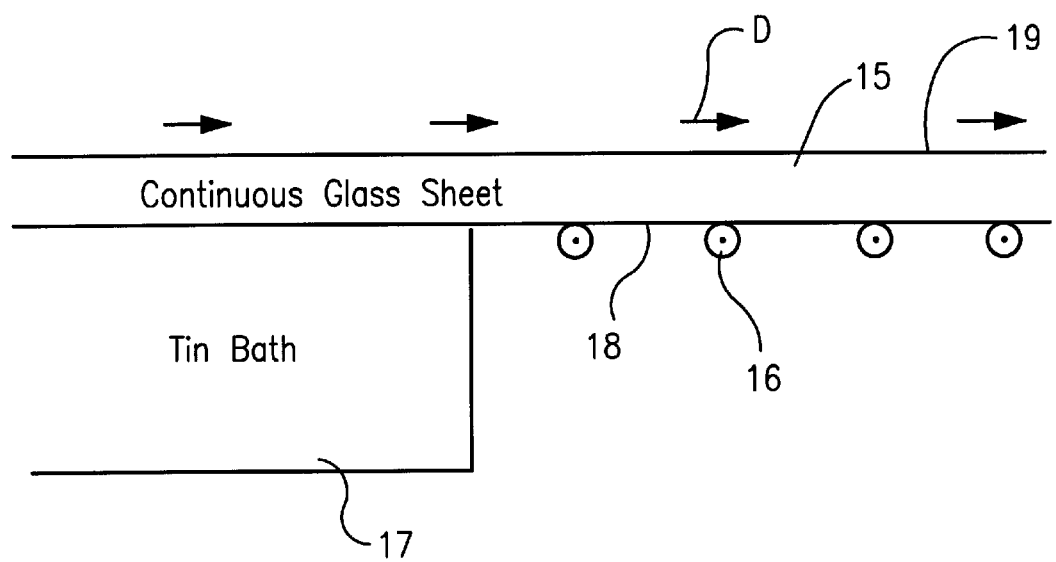
FIG. 2 is a side schematic cross sectional diagram of a glass sheet being formed via a float process.

To begin with, a glass sheet 15 which many be continuous in nature is made using the known float process (step 1 in FIG. 1). As shown in FIG. 2, during the float process glass strip 15 is moved in direction D on and over supporting molten tin bath 17. After exiting the tin bath 17 area, the glass strip is supported by rollers 16 and moved toward further known processing areas. In preferred embodiments of this invention, glass 15 is soda-lime-silica type float glass.

It will be appreciated by those skilled in the art that as a result of forming the glass 15 on molten tin 17, small amounts of tin or tin oxide tend to migrate into surface areas of the glass on the side that was in contact with the tin bath 17 during manufacture (i.e., typically, float glass may have a tin oxide concentration of 0.05% or more (wt.) in the first few microns below the surface that was in contact with the tin bath). Thus, glass strip or sheet 15 has a tin side 18 and a non-tin side 19, the tin side 18 having been directly over the tin bath during the float process.

Figure 3:
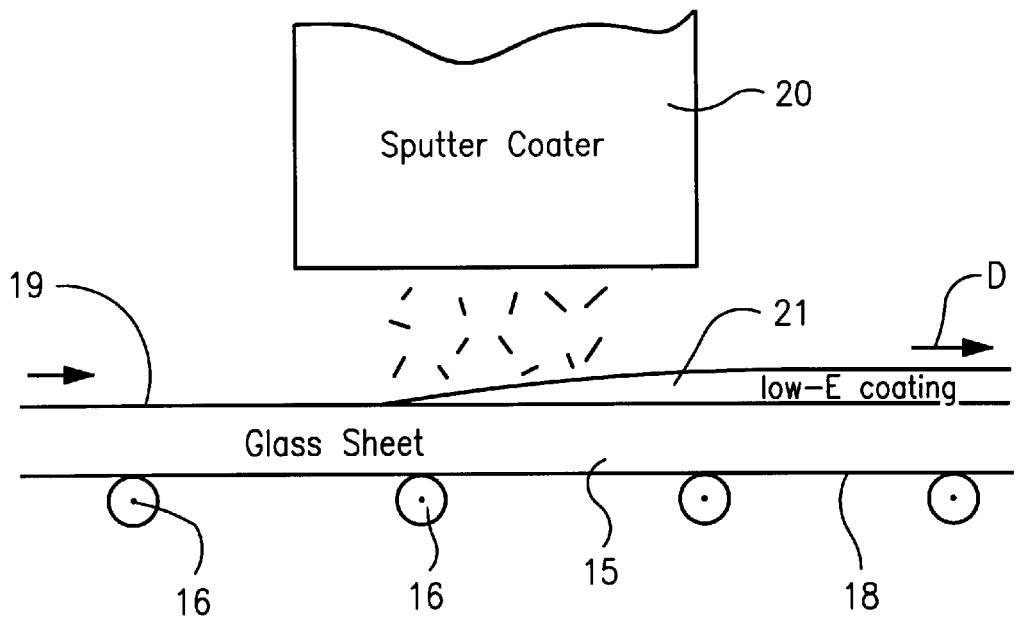
FIG. 3 is a side schematic cross sectional diagram of a coating (e.g., low-E coating) being sputter coated onto the surface of a glass sheet.

Referring to FIG. 3, glass 15 (preferably after being cut and cooled) is processed through a known sputter coating apparatus 20 in order to deposit a low-E coating (or any other suitable coating) 21 on the non-tin-side of the glass sheet (step 2 in FIG. 1). As shown in FIG. 3, glass sheet(s) 15 is/are moved in direction D through the coating zone beneath sputtering targets in coater 20 so as to deposit coating 21 onto the glass substrate or sheet. For purposes of example only, and without limitation, it is noted that any of the coatings described and/or illustrated in any of U.S. Pat. Nos. 5,298,048, 5,557,462, or 5,584,902 may be used and deposited as coating 21 according to different embodiments of this invention, each of these patents hereby being incorporated herein by reference. For windshield applications, it is often preferred that only one of the two glass sheets ending up in the final windshield be sputter coated with a coating 21. As will be appreciated by those skilled in the art, this step 2 (shown in FIG. 3) is optional. After exiting the sputter coater, elongated glass sheets may be cut into smaller pieces in certain embodiments.

The edges of a first flat glass sheet 22 and a second flat glass sheet 23 are then trimmed so that they each have a peripheral edge in the shape of the desired windshield (step 3 in FIG. 1). For example, see the peripheral shape of the windshield in FIG. 3 of U.S. Pat. No. 4,704,174, the disclosure of which is hereby incorporated herein by reference. It will be appreciated by those skilled in the art that the two sheets 22 and 23 may or may not come from the same float glass strip 15 in different embodiments of this invention. One 23 of the two sheets 22 and 23 preferably has coating 21 thereon.

Figure 4:
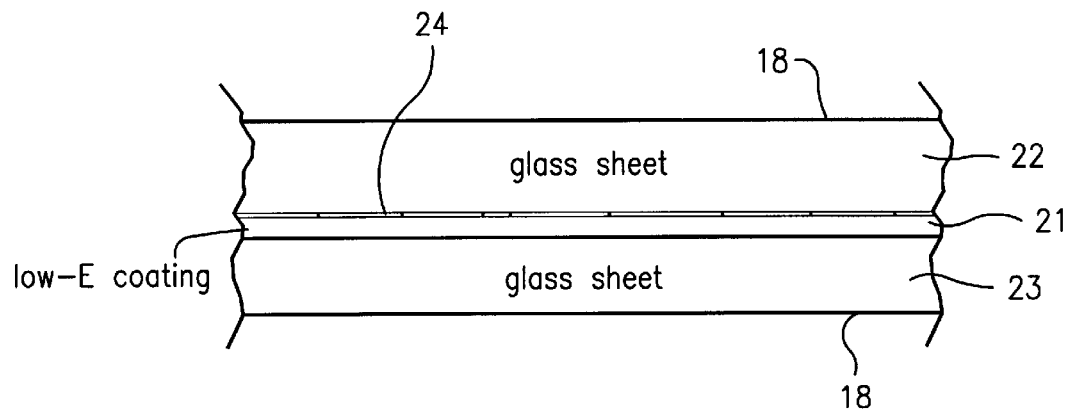
FIG. 4 is a side cross sectional view of first and second glass sheets in juxtaposed position prior to lamination, during the course of the process of an embodiment of this invention.

As shown in FIG. 4, the trimmed first and second sheets are then put together in juxtaposed position so that coating 21 on sheet 23 is on the interior side and faces the other sheet 22 (step 4 in FIG. 1). Preferably, the tin side 18 of at least one of the sheets is on the outside. Optionally, a known silica based dry powder spacer material 24 is provided between the sheets in this step.

Figure 5:
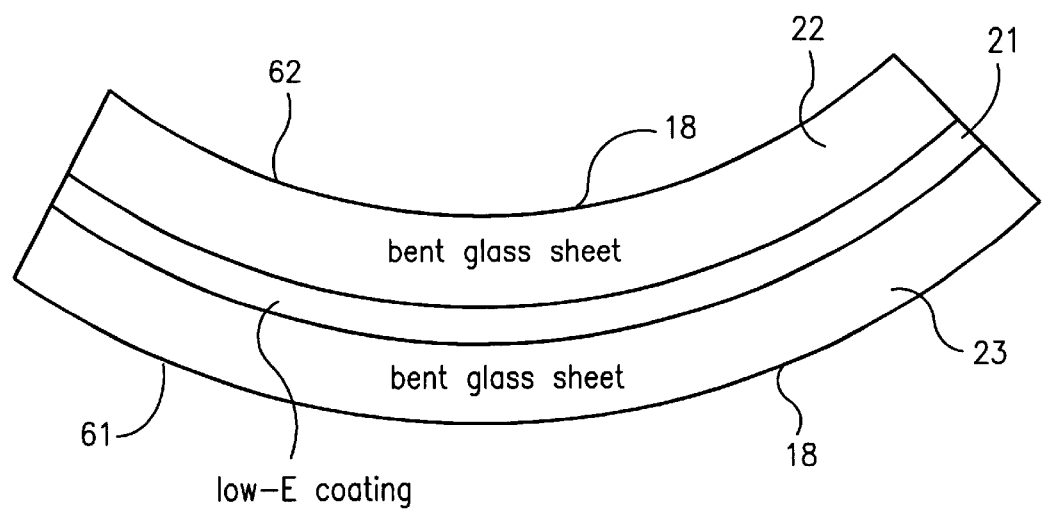
FIG. 5 is a side cross sectional view of the FIG. 4 sheets after being heat bent together in juxtaposed position, during the course of the process of an embodiment of this invention.

Thereafter, as shown in FIG. 5, the sheets 22, 23 while in the juxtaposed position of FIG. 4 are placed on a rack and conveyed along with the rack into a known bending furnace. Each glass sheet 22, 23 is preferably from about 1. to 10.0 mm thick, more preferably from about 1.7 to 4.0 mm thick. In the bending furnace or lehr, the sheets of FIG. 4 are heated to a temperature of from about 600 to 1400 degrees C., more preferably from about 600 to 1200 degrees C., so that the two sheets 22, 23 sag and/or bend together into the desired windshield curvature as shown in FIG. 5 (step 5 in FIG. 1). The resulting bent structure of FIG. 5 includes the first and second bent glass sheets 22 and 23; but the sheets 22 and 23 are not adhered to one another at this point. Thus, the two glass sheets 22 and 23 have been heat bent together into the desired windshield shape. As will be appreciated by those skilled in the art, side 61 (i.e., the convex surface/side) is to be the exterior surface of the resulting vehicle windshield, while side 62 (i.e., the concave surface/side) is to be the interior surface (i.e., at the vehicle interior) of the resulting windshield. Convex side 61 has a greater radius (or radii) of curvature(s) than does concave side 62. In many embodiments of this invention, the radius (or radii) of curvature of both sides 61, 62 varies throughout the length of the windshield as a function of the vehicle in which the windshield is to be installed.

Figure 6:
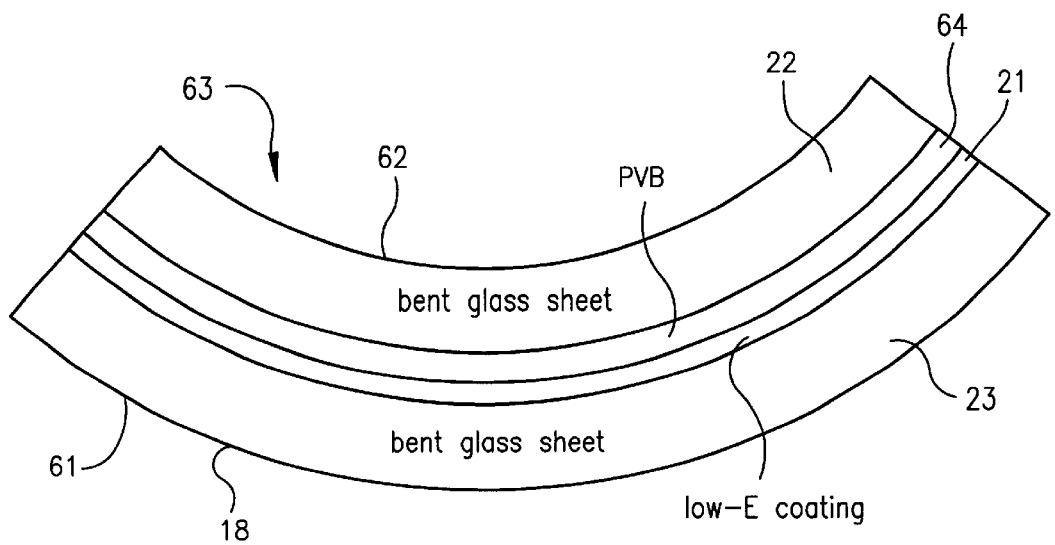
FIG. 6 is a side cross sectional view of the FIG. 5 bent/curved sheets after the sheets have been separated and an interlayer (e.g., PVB interlayer) provided therebetween, with the sheets thereafter returned to a juxtaposed position sandwiching the interlayer therebetween and heated in order to bond the glass sheets together about at least the interlayer.

After gradual cooling (step 6 in FIG. 1), the two bent sheets 22, 23 of FIG. 5 are separated from one another, and polymer based interlayer 64 is positioned between the two sheets 22, 23. Then, the sheets are brought back into juxtaposed position about the interlayer 64 as shown in FIG. 6 (step 7 in FIG. 1). Laminating interlayer 64 is preferably of or including polyvinyl butyral (PVB), but may instead include or be of other laminating polymer based materials including but not limited to polyurethane or any other conventional interlayer material in any of U.S. Pat. Nos. 3,700,542, 5,509,015, 4,241,140, 3,522,143, 4,062,887. The structure including sheets 22 and 23 with interlayer 64 therebetween is processed through a known pinch roll(s) apparatus in order to remove any trapped air or gas from the interfacial spaces between the various plies or layers.

Following the pinch roll(s) apparatus (not shown), the structure including sheets 22, 23 with interlayer 64 therebetween is heated and subjected to pressure in an autoclave sufficient to cause the two sheets to become laminated to one another via interlayer 64 (step 8 in FIG. 1). In the autoclave, for example, the structure is heated to a temperature of from about 70–110 degrees C. so that the PVB adheres to the opposing sheets 22, 23. The resulting bent laminate glazing 63 is illustrated in FIG. 6.

Figure 7:
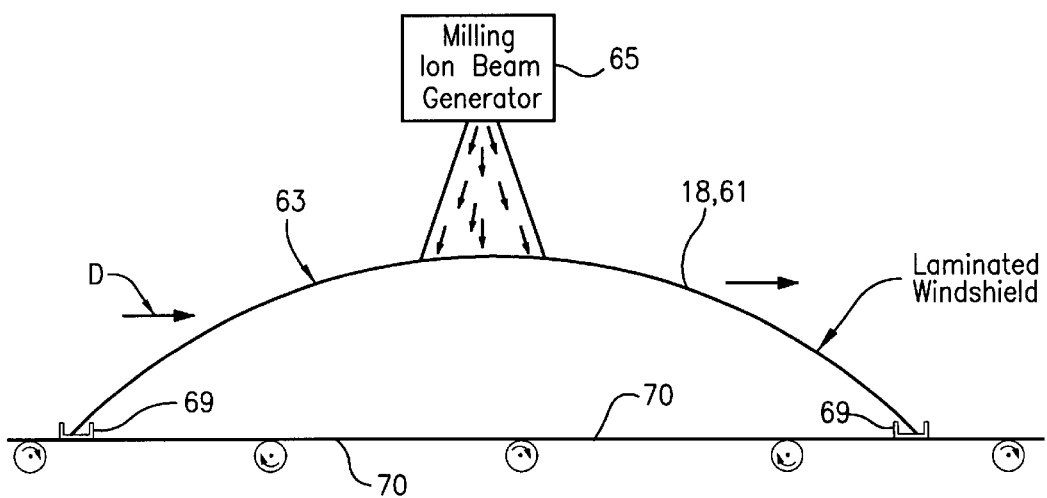
FIG. 7 is a schematic diagram of the convex or exterior tin side surface of the FIG. 6 bent laminate being ion beam milled during the course of the process of an embodiment of this invention, where the bent laminate is shown cross sectionally.

After the bent laminate 63 of FIG. 6 is formed, it is inverted and passed under an ion beam source 65 as shown in FIG. 7. As can be seen in FIG. 7, the bent laminate 63 is supported via supports 69 on conveyor 70, and is processed in direction D under source 65. Ion beam from source 65 mills the exterior curved surface (i.e., convex surface) 61 of the bent laminate glazing (step 10 in FIG. 1). In other words, the convex tin side 18 of bent glass sheet 23 is ion beam milled by source 6. This has the advantages of both removing tin (Sn or SnO), Na, and/or the like from the sheet, and smoothening out the surface.

Figure 8:
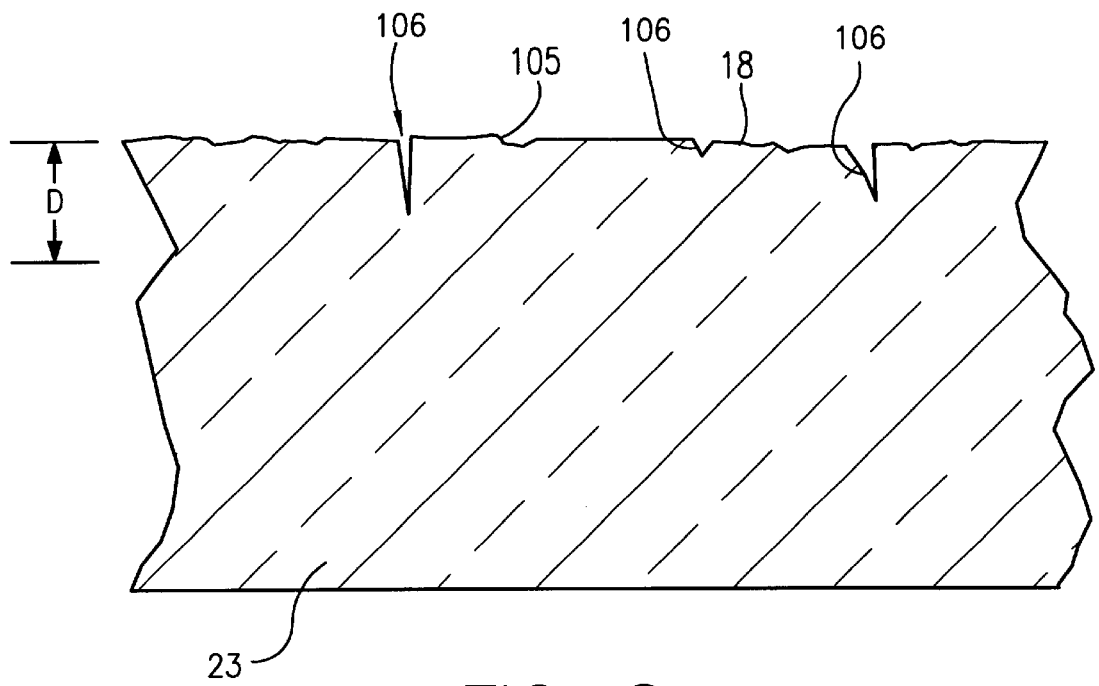
FIG. 8 illustrates the exterior surface of the bent FIG. 6 laminate prior to the FIG. 7 ion beam milling.
Figure 9:
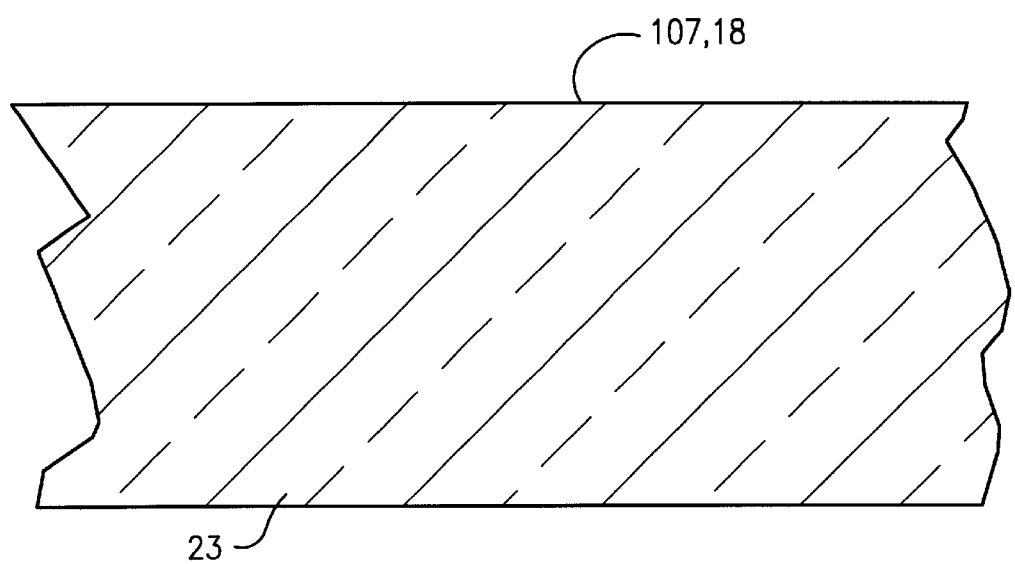
FIG. 9 illustrates the exterior surface of the bent FIG. 6 laminate after the FIG. 7 ion beam milling (it is noted that the surface of the sheet to receive the coating thereon has been smoothed by the milling, and certain nano-cracks have been removed).

FIGS. 8 and 9 are close-up views illustrating what the convex or exterior tin side of glass sheet 23 looks like both before (FIG. 8) and after (FIG. 9) the ion beam milling procedure.

FIG. 8 is a side cross sectional view of a small portion of bent glass sheet 23 of bent laminate 63. The sheet is illustrated as being flat in this figure for purposes of simplicity (although it is curved as discussed above). As can be seen, the tin side 18 surface 105 of sheet 23 has a rather roughened surface, and also includes nano-cracks 106 defined therein. It has been found that the presence of the nano-cracks and surface roughness may adversely affect the adherence of a coating to the surface of the sheet. Referring back to FIG. 7, the entire surface 105 of sheet 23 is passed under one or more linear ion beam sources (preferably emitting focused ion beams, although non-focused beams may be used in certain embodiments) 65 that extend at least across the entire surface 105 of the sheet in order to ion beam mill the convex surface 18, 105 of sheet 23. This ion milling shaves off or removes a portion of the surface of the glass sheet. For example, in certain embodiments of this invention, the ion beam milling removes from about 2–100 angstroms (Å) (e.g., see depth "D" of shaved off glass in FIG. 8), more preferably from about 2–50 Å, even more preferably from about 4–20 Å, and most preferably from about 6–12 Å of glass from the tin side 18 surface 105 of bent glass sheet 23.

Preferably, argon (Ar) ions are used to conduct the milling of the tin side of sheet 23 (i.e., Ar gas is used in the ion beam source to produce mostly Ar+ions that are directed toward the convex surface to perform the milling). Alternatively or additionally, other types of ions may instead be used (e.g., other inert gas ions such as Kr, Ne, and/or Xe) in the focused ion beam to perform the milling of sheet 23. Inert gas ions are preferred so as to minimize potential reactions with the sheet. The ion beam milling is preferably performed in a vacuum chamber where the ion beam source(s) and the sheet 23 being milled are located. A pressure of from about $5.0 \times 10^{-4}$ to $1.0 \times 10^{-4}$ is preferably maintained in this vacuum chamber (see 85 in FIG. 12) during the milling process. Additionally, each ion beam source is preferably operated during the ion beam milling process so that the beam has an ion energy of from about 300 to 5,000 eV, more preferably from about 1,500 to 2,000 eV, and most preferably from about 1,400 to 1,600 eV. One or more ion beam sources may be used during the milling process. Further details of an exemplary ion beam milling process that may be used are illustrated and described in commonly owned U.S. Ser. No. 09/703,709, filed Nov. 2, 2000, the disclosure of which is hereby incorporated herein by reference.

FIG. 9 is a side cross sectional view of sheet 23 of laminate 63 after step 10 (i.e., after the tin side 18 of the sheet 23 has been ion beam milled). As can be seen from comparing FIG. 8 (tin side of bent sheet 23 of laminate 63 before milling) with FIG. 9 (tin side of bent sheet 23 of laminate 63 after milling), the ion beam milling removes an amount "D" of glass from the surface of the sheet 23 and thereby smoothens the exterior or tin side surface thereof. Moreover, it can be seen that the ion beam milling removes or substantially reduces many of the nano-cracks 106 that were originally present at the tin side surface of the sheet 23.

Figure 10:
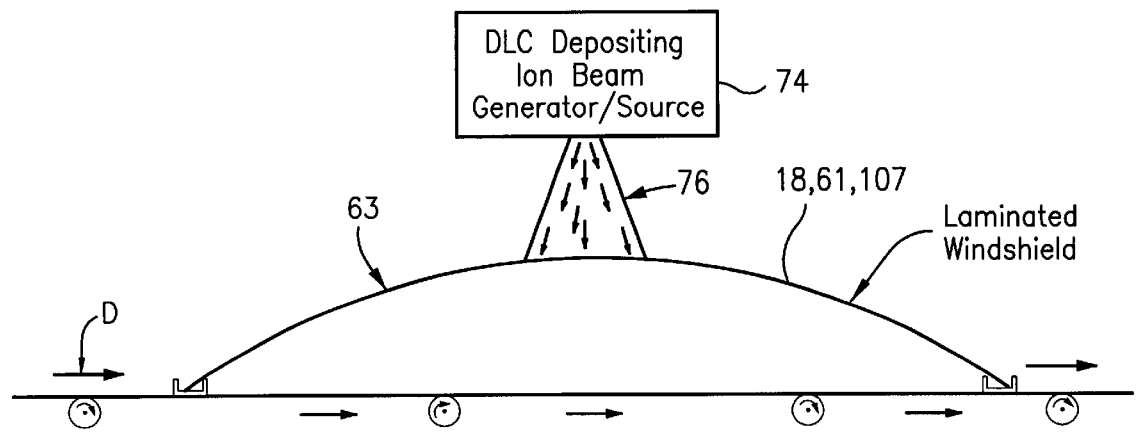
FIG. 10 illustrates the FIG. 6 bent laminate, after being ion beam milled per FIG. 7, being passed under an ion beam source which deposits a DLC-inclusive coating (including one or more layers) onto the milled and curved/convex exterior surface of the laminate.
Figure 11:
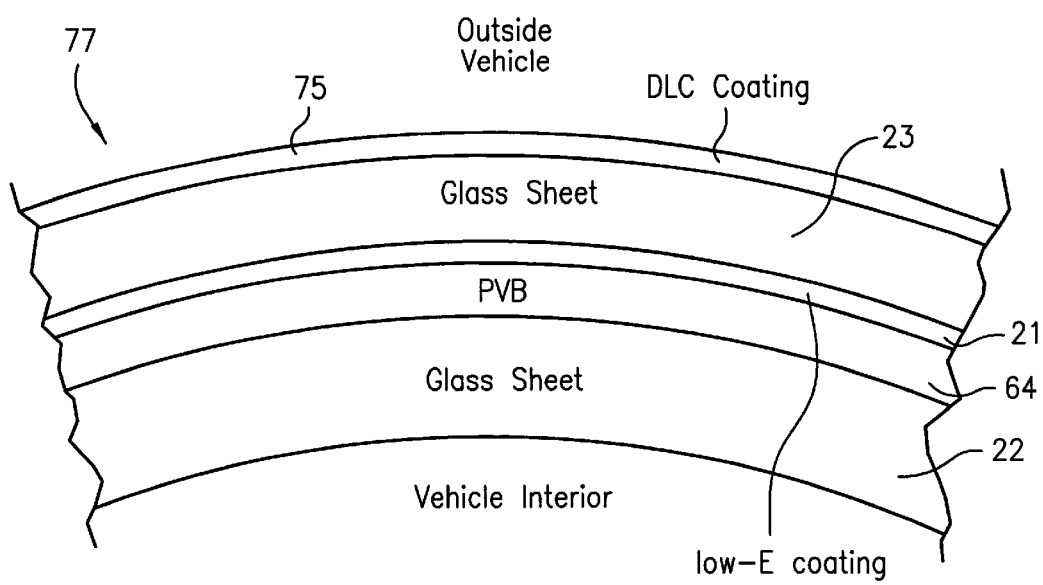
FIG. 11 is a side cross sectional view of a portion of the resulting curved vehicle windshield after the DLC inclusive coating has been deposited thereon in FIG. 10.

Referring to FIGS. 10–11, after the convex tin side 18 of sheet 23 of bent/curved laminate 63 has been ion beam milled, a coating (including one or more layers) 75 is ion beam deposited on smoothened/milled surface 107 of the bent laminate 63 (step 11 of FIG. 1). For example, as will be explained below, a DLC inclusive coating 75 may be deposited on the milled surface 61, 107 via ion beam 76 from ion beam source 74. Ion energy used to deposit coating 75 may be from about 300 to 1500 eV (or 150–750 per carbon atom) in certain embodiments of this invention, more preferably from about 600 to 1500 eV. Coating 75, deposited via at least one ion beam source(s) 74 on the curved exterior surface of the bent laminate 63, may for example be any of the DLC inclusive coatings (or layer systems) described and/or illustrated in any of commonly owned U.S. patent application Ser. No. 09/703,709, filed Nov. 2, 2000; Ser. No. 09/657,132, filed Sep. 7, 2000; Ser. No. 09/627,441, filed Jul. 28, 2000; Ser. No. 09/617,815 filed Jul. 17, 2000; Ser. No. 09/303,548, filed May 3, 1999; Ser. No. 09/442,805, filed Nov. 18, 1999; and Ser. No. 09/583,862 filed Jun. 1, 2000, the disclosures of which are all hereby incorporated herein by reference.

Coating 75 preferably includes at least one DLC inclusive layer including some amount of DLC in the form of highly tetrahedral amorphous carbon (ta-C) (i.e., including $sp^3$ carbon—carbon (C—C) bonds), in order to enhance the durability and/or scratch resistance of the coated article. In certain preferred embodiments, this DLC inclusive layer is subimplanted into the underlying glass sheet 23. This DLC inclusive layer preferably includes more $sp^3$ carbon—carbon (C—C) bonds than $sp^2$ carbon—carbon (C—C)

bonds, and preferably includes at least about 50% sp³ carbon—carbon (C—C) bonds, more preferably at least about 60% (this is a special form of DLC). This ta-C may be hydrogenated (i.e., ta-C:H) in certain embodiments of this invention, e.g., to enhance hydrophobic characteristics. The DLC inclusive layer(s) of the coating is preferably deposited via the ion beam source(s) 74 using at least a hydrocarbon gas such as $C_2H_2$ (acetylene). Other gas(es) such as oxygen and/or argon may be used in combination with acetylene during this deposition process. In other embodiments of this invention, acetylene gas may be replaced or complimented with any other suitable hydrocarbon or other type gas for use in or adjacent the ion beam. Coating 75 preferably has an average hardness (measured via a nano-indentation hardness measuring technique) of from about 45–85 GPa, more preferably from about 50–70 GPa, and most preferably from about 55–60 GPa in exemplary embodiments of this invention. Coating 75 may be from about 10 to 500 angstroms thick, more preferably from about 10 to 250 angstroms thick, and most preferably about 30–150 angstroms (Å) thick in certain embodiments of this invention. However, these thicknesses are not intended to be limiting. Moreover, coating 75 is at least about 60% transparent to or transmissive of visible light rays, more preferably at least about 70% transmissive, even more preferably at least about 85% transmissive, and most preferably at least about 95% transmissive of visible light rays.

When hydrophobicity is desired for DLC inclusive coating 75, atoms in addition to carbon (C) may be provided in at least the DLC inclusive portion of the coating. For example, the outermost portion of the DLC inclusive coating (e.g., taking the entire layer thickness, or only a thin 10 Å thick layer portion thereof into consideration) may include in addition to the carbon atoms, by atomic percentage, from about 0–20% Si (more preferably from about 0–10%), from about 0–20% oxygen (O) (more preferably from about 0–15%), and from about 5–60% hydrogen (H) (more preferably from about 5–35% H). Optionally, in such embodiments at least the outermost portion of coating 75 may include from about 0–10% (atomic percentage) fluorine (F) (more preferably from about 0–5% F) in order to further enhance hydrophobic characteristics of the coating. This is discussed in more detail in one or more of the parent cases, incorporated herein by reference. In general, the provision of H near the surface of coating 75 reduces the number of polar bonds at the coating's surface, thereby improving the coating system's hydrophobic properties. These material(s) may or may not be provided in coating 75 when a hydrophobic coating system is not desired. In hydrophobic embodiments of this invention, DLC inclusive coating 75 has an initial contact angle θ of at least about 55 degrees (more preferably of at least about 80 degrees, even more preferably of at least about 100 degrees, and most preferably of at least about 110 degrees).

Figure 15:
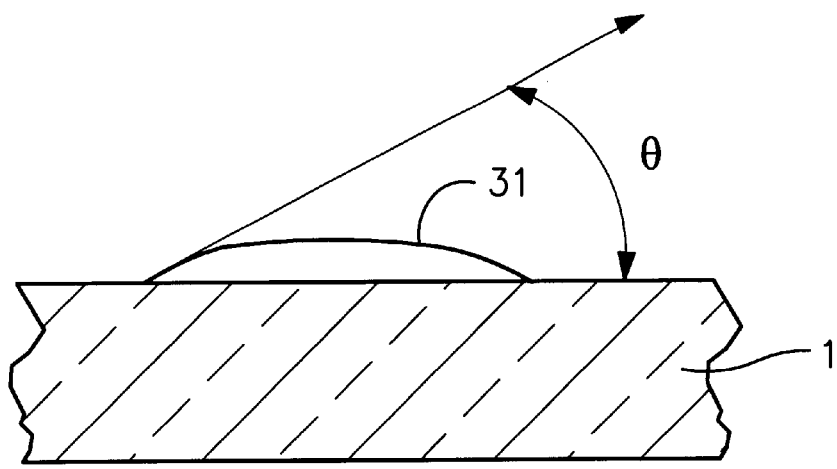
FIG. 15 is a side cross sectional partially schematic view illustrating a low contact angle θ of a water drop on the exterior curved surface of a conventional glass sheet (with no hydrophobic coating on the sheet).
Figure 16:
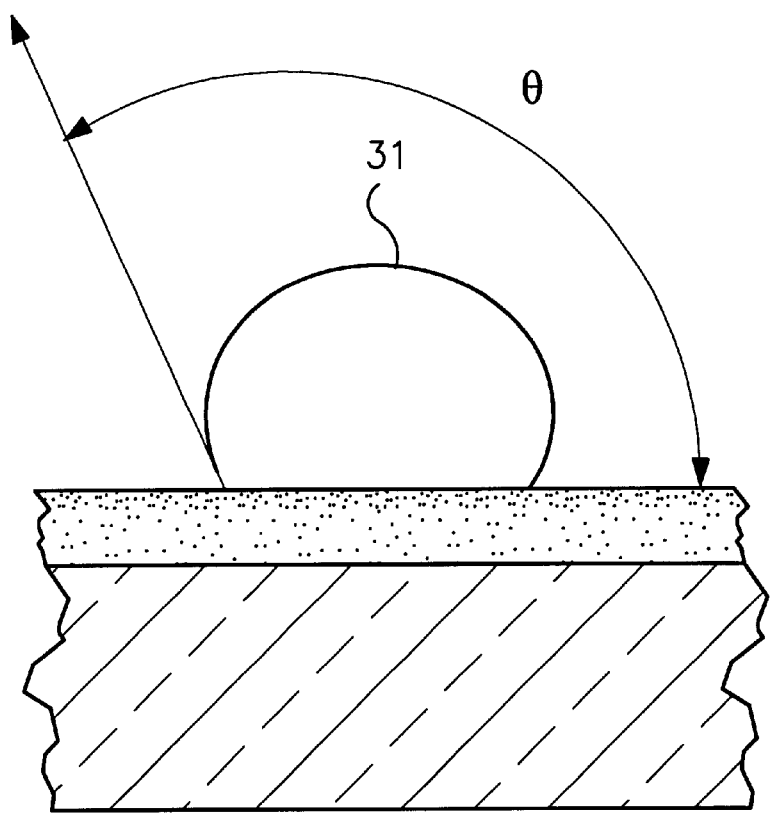
FIG. 16 is a side cross sectional partially schematic view illustrating a high contact angle θ of a water drop on the exterior surface of a windshield according to any embodiment of this invention (in embodiments where hydrophobicity is desired, which need not be all embodiments).

For further explanation of hydrophobicity and contact angle, reference is made to FIGS. 15–16. The initial contact angle θ of a conventional glass substrate with sessile water drop 31 thereon is typically from about 22–24 degrees, although it may dip as low as 17 or so degrees in some circumstances, as illustrated in FIG. 15. Thus, conventional glass substrates are not particularly hydrophobic in nature. In hydrophobic embodiments of this invention, the provision of coating 75 on the tin side of sheet 23 of the curved laminate causes the contact angle θ of the windshield to increase to the angles discussed herein, as shown in FIG. 16 for example, thereby improving the hydrophobic nature of the article. As discussed in Table 1 of Ser. No. 09/303,548, the contact angle θ of a ta-C DLC layer is typically less than 50 degrees, although it may be higher than that in certain circumstances as a function of ion energy. However, the makeup of DLC-inclusive coating 75 described herein enables the initial contact angle θ of the system relative to a water drop (i.e. sessile drop 31 of water) to be increased in certain embodiments to at least about 55 degrees, more preferably of at least about 80 degrees, even more preferably to at least about 100 degrees, even more preferably at least about 110 degrees, and most preferably at least about 125 degrees, thereby improving the hydrophobic characteristics of the DLC-inclusive coating 75. An "initial" contact angle θ means prior to exposure to environmental conditions such as sun, rain, abrasions, humidity, etc.

Surprisingly, it has been found that the ion beam milling of the sheet 23 as described above prior to deposition of a DLC inclusive layer system or coating 75 on the smoothened surface 61, 107 of the sheet 23 (and laminate 63) results in a more scratch resistant DLC inclusive coating than if such ion beam milling had not occurred. Moreover, it has been found that the ion beam milling also results in improved adherence of the coating to bent/curved surface 61, 107 of sheet 23 (and laminate 63). For example, the ion beam milling is performed in a manner so as to increase scratch resistance (SR) of the coated article by at least a factor of two, and so that an average surface roughness of the ion beam milled surface of the laminate following said ion beam milling is no more than about 80% of what an average surface roughness of the laminate was prior to the ion beam milling.

Figure 12:
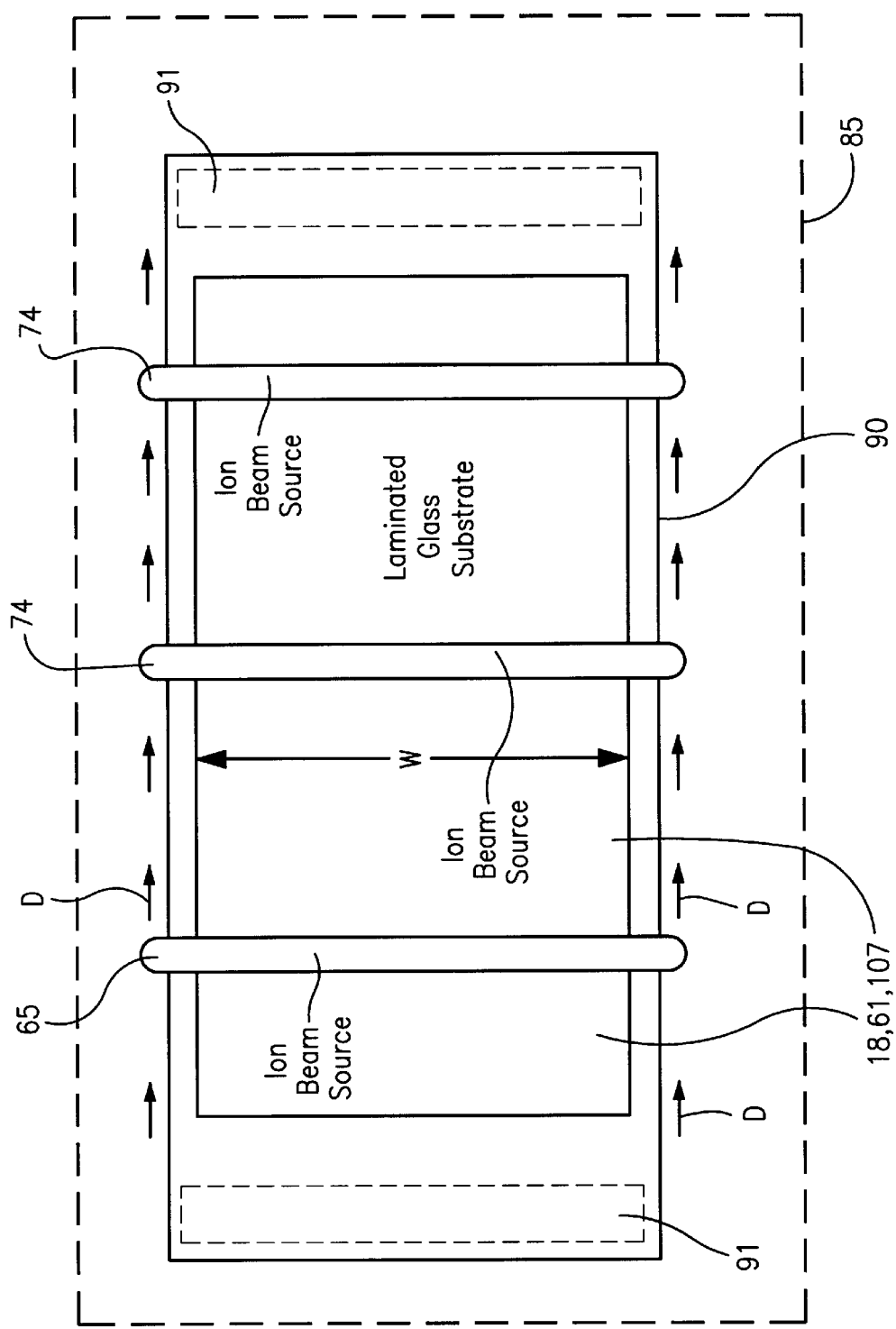
FIG. 12 is a top view of an exemplary apparatus for milling and/or depositing a DLC inclusive coating onto the convex surface of the FIG. 6 bent laminate.

FIG. 12 is a top view of an exemplary apparatus for ion beam milling and/or depositing coating 75 on the convex surface of bent/curved laminate 63. In certain exemplary embodiments of this invention, this apparatus may include both the FIG. 7 ion beam generator and the FIG. 10 ion beam generator. As can be seen, three separate fixed ion beam sources 65, 74 are provided in vacuum chamber 85, each source being linear and/or elongated in shape and having a length that extends across at least the entire width "W" of the convex exterior surface 18, 61, 107 of the bent laminate 63 which is passing thereunder in direction D on conveyor 90 (conveyor 90 may includes one or more drive rolls 91). Surprisingly, it has been found that using sources 74 of length significantly longer (e.g., at least about 4 inches longer, more preferably at least about 10 inches longer) than width W of the bent laminate 63 enables the coating 75 to be ion beam deposited to an approximately uniform thickness across the entire outer curved surface 61, 107 of laminate 63 (even though the laminate surface is curved as illustrated in the figures). In the illustrated embodiment, for purposes of example only, at least one source(s) 65 performs the milling of the curved outer surface of the bent laminate while at least first and second ion sources 74 deposit DLC inclusive coating 75 on the ion beam milled surface. Alternatively, additional milling source(s) may be provided as may additional coating depositing source(s).

The curved laminate 63 preferably does not rise to a temperature above 70 degrees C. (more preferably never rises about 60 degrees C., and most preferably is at about room temperature) in vacuum chamber 85 when the ion beam milling and/or ion beam coating deposition(s) are being performed. Laminate 63, for example, moves through the vacuum chamber at a rate of at least 30 inches per minutes, more preferably from about 30–350 inches per minute, and more preferably from about 90 to 300 inches per minute. This enables interlayer 64 (which is often heat sensitive) to maintain good adhesion between the two sheets 22 and 23 (i.e., reducing the potential for delamination) since the interlayer does not heat up too much.

Figure 13:
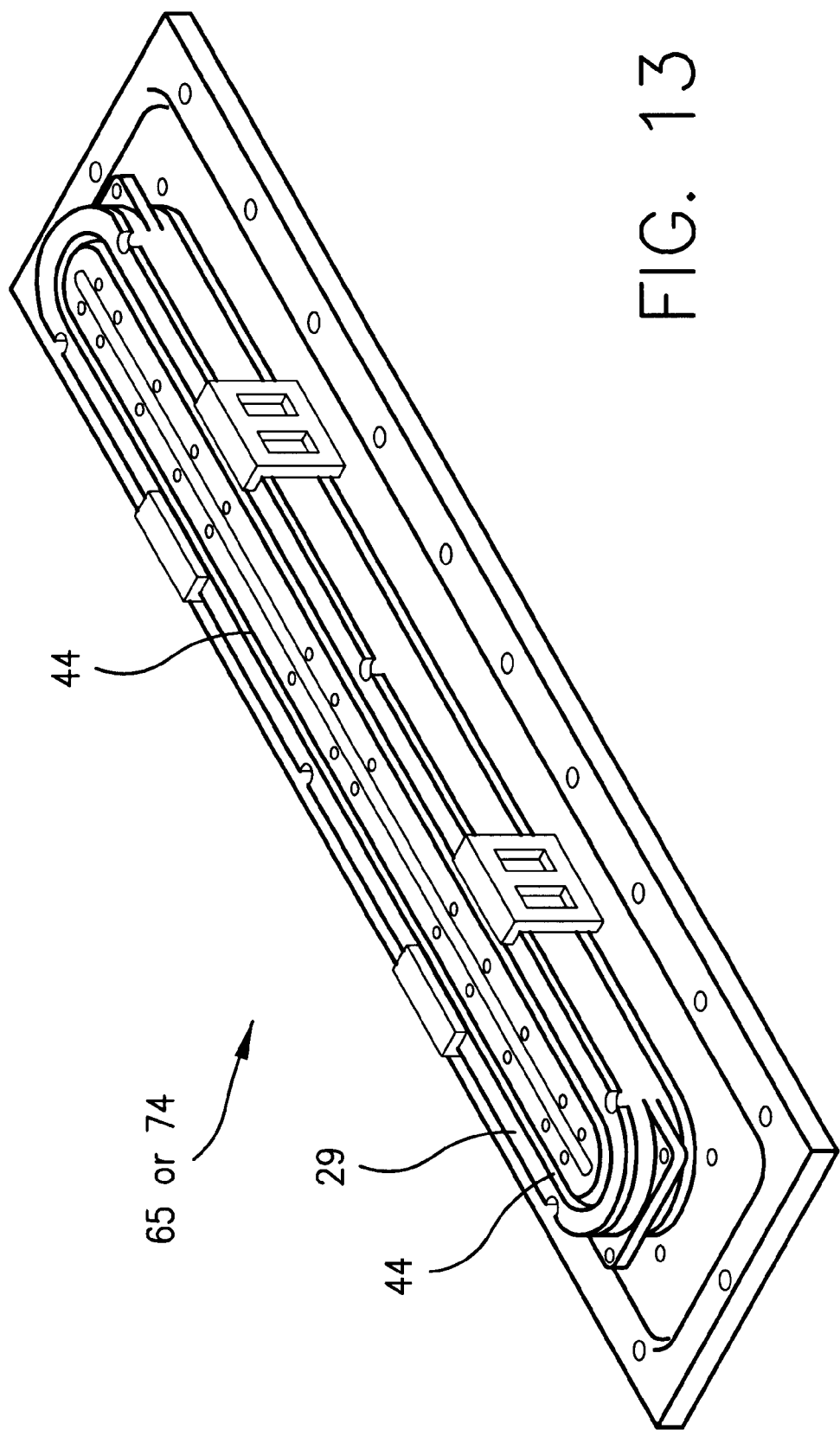
FIG. 13 is a perspective view of an exemplary ion beam source of FIG. 12.
Figure 14:
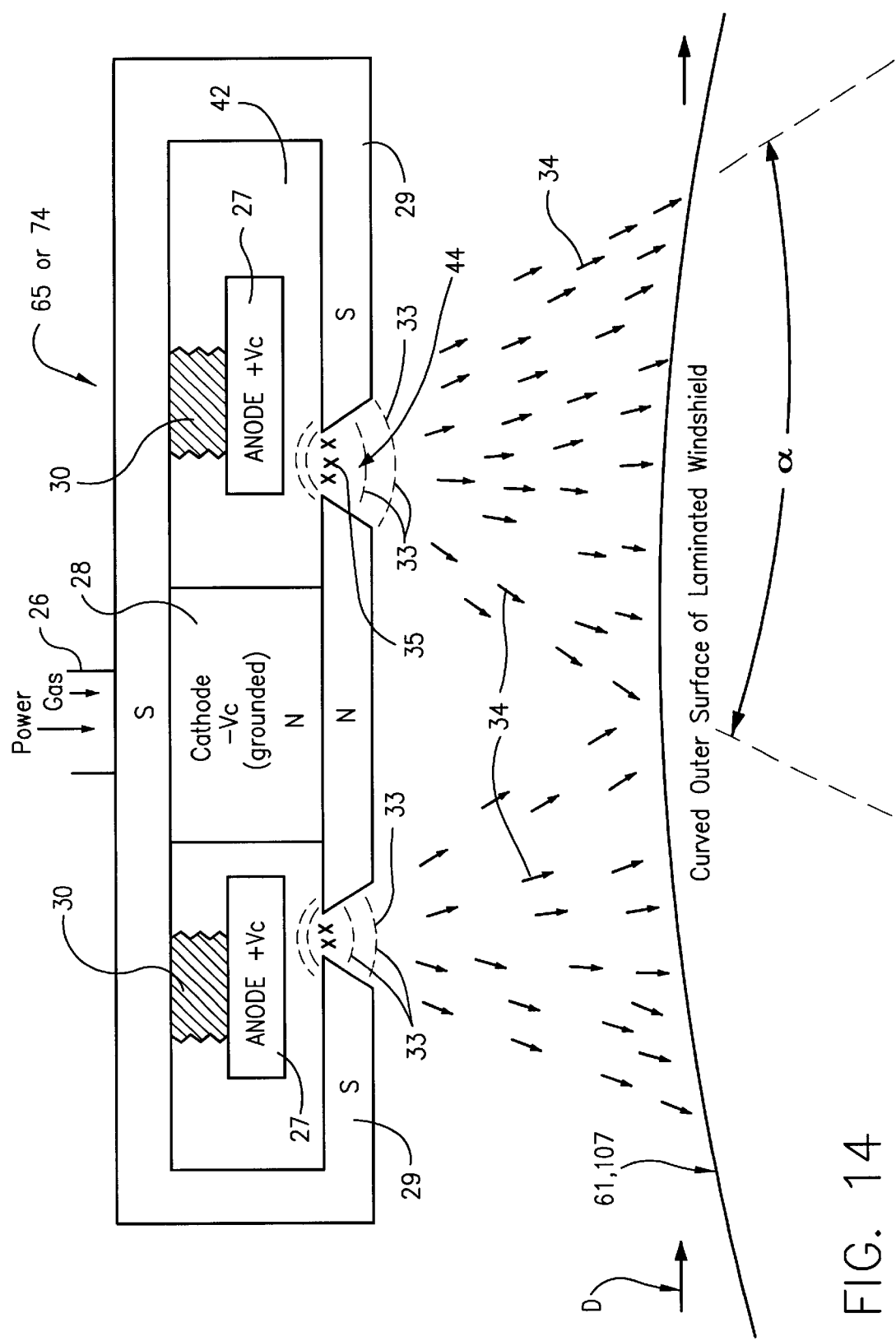
FIG. 14 is a side cross sectional view of the ion beam source of FIG. 13 (and FIG. 12) with the bent laminate passing thereunder as shown in FIGS. 7 and 10.

FIGS. 13–14 illustrate an exemplary linear or direct ion beam source (65 or 74) which may be used to mill sheet 23 or to deposit coating 75 as discussed above relative to FIGS. 7–12. Ion beam source (65 or 74) includes gas/power inlet 26, racetrack shaped anode 27, grounded cathode magnet portion 28, magnet poles (S) 29, and insulators 30. A 3 kV DC power supply may be used for power in some embodiments. Linear source ion deposition allows for substantially uniform deposition of coating 75 as to thickness and stoichiometry. The ion beam from the source is preferably non-focused in view of the curved surface on which the coating is being deposited. The beam may be focused or non-focused for milling.

Ion beam source (65 or 74) is based upon a known gridless ion source design. The linear source is composed of a linear shell (which is the cathode and grounded) inside of which lies a concentric anode (which is at a positive potential) 27. This geometry of cathode-anode and magnetic field 33 gives rise to a closed drift condition. The anode layer ion source can also work in a reactive mode (e.g. with oxygen and nitrogen). The source includes a metal housing with a racetrack shaped slit 44 as shown in FIGS. 14–15. The hollow housing is at ground potential. The anode electrode is situated within the cathode body (though electrically insulated) and is positioned just below the slit. The anode can be connected to a positive potential as high was 3,000 or more volts (V). Electron layer 35 completes the circuit thereby enabling the ion beam source to function properly. Both electrodes may be water cooled in certain embodiments. Feedstock/precursor gases (e.g. Ar, acetylene, etc.), described herein, are fed through the cavity between the anode and cathode. The gas(es) used determines the make-up of the resulting layer deposited on an adjacent laminate 63, or the type of milling beam impinging upon the laminate.

The linear ion source may also contain a labyrinth system that distributes the precursor gas (e.g., TMS (i.e., $(CH_3)_4Si$ or tetramethylsilane); acetylene (i.e., $C_2H_2$); 3MS (i.e., trimethyldisilane); DMS (i.e., dichloro-dimethylsilane); hexane; methane; Ar; Kr; Xe; Ne; HMDSO (i.e., hexamethyldisiloxane); TEOS (i.e., tetraethoxysilane), etc.) fairly evenly along its length and which allows it to supersonically expand between the anode-cathode space internally. The gases may be fed through the ion beam source via cavity 42 until they reach the area near slit 44 where they are ionized. The electrical energy cracks the gas to produce a plasma within the source. The ions (e.g., Ar+ions for milling) are expelled out at energies in the order of eVc-a/2 when the voltage is Vc-a. The ion beam emanating from the slit is approximately uniform in the longitudinal direction and has a Gaussian profile in the transverse direction. Exemplary ions 34 are shown in FIG. 14. Ion beam, when non-focused in the instant curved surface application, preferably is directed toward the curved sheet 23 surface at an angle α of from about 20 to 45 degrees, more preferably at an angle α of from about 30 to 42 degrees, and most preferably about 36 degrees. This angle α enables most if not all areas on the exterior surface 61, 107 of sheet 23 to be hit with ions at an angle of incidence of approximately 90 degrees (i.e., 90 degrees plus/minus five degrees) at some point during the travel in direction D under or proximate the ion beam source; thereby enabling efficient milling and/or coating deposition via an ion beam on the curved/convex surface 61, 107 of sheet 23. A source as long as one meter may be made, although sources of different lengths are anticipated in different embodiments of this invention.

Referring to FIGS. 7, 10 and/or 14, as the glass traverses under the ion beam, the leading edge of the ion beam deposits the most on the leading edge of the glass (angle of incidence within 5 degrees of zero or normal), and the center of the beam deposits the most on the center of the glass (at top of the apex), and the trailing part of the beam deposits most on the trailing part of the glass. These three processes are summed up and averaged because of the relative motion of the deposition rate over the entire surface to provide and approximately uniform coating thickness. In alternative embodiments, a concave surface could also be coated inversely regarding the above.

In alternative embodiments of this invention, an ion beam source device(s) or apparatus as described and shown in prior art FIGS. 1–3 of U.S. Pat. No. 6,002,208 (hereby incorporated herein by reference in its entirety) may be used to mill sheet 23 and/or deposit DLC inclusive coating 75 on the milled surface of sheet 23.

Once given the above disclosure, many other features, modifications, and improvements will become apparent to the skilled artisan. Such other features, modifications, and improvements are, therefore, considered to be a part of this invention, the scope of which is to be determined by the following claims. For example and without limitation, certain coated articles according to this invention may be hydrophobic, other coated articles according to this invention may be hydrophilic, and still other coated articles according to this invention may be neither hydrophobic nor hydrophilic.

In still further embodiments of this invention, the aforesaid milling and/or coating need not be applied to a laminated article or windshield. Instead, in other embodiments of this invention coating 75 can be deposited onto a convex shaped substrate such as a curved glass substrate for a skylight, a curved glass substrate for a vehicle rear or side window, or any other type of curved substrate. Likewise, in other embodiments of this invention the aforesaid ion beam milling can be performed on a convex shaped substrate such as a curved glass substrate for a skylight, a curved glass substrate for a vehicle rear or side window, or any other type of single piece curved substrate.

What is claimed is:

1. A method of making a curved laminated vehicle windshield, the method comprising:

providing first and second glass sheets;

placing the first and second glass sheets in juxtaposed relation with one another and heat bending the sheets together;

positioning an interlayer between the two heat bent glass sheets;

heating the glass sheets with interlayer therebetween in order to laminate the first and second glass sheets to one another via at least the interlayer, thereby forming a curved laminate including a convex surface and a concave surface;

ion beam milling the convex surface of the curved laminate in order to shave off or remove a portion of the first glass sheet thereby forming a milled convex glass surface of the curved laminate;

ion beam depositing a diamond-like carbon (DLC) inclusive coating directly on the milled convex glass surface of the curved laminate using a non-focused ion beam so that the DLC inclusive coating contacts the glass of the milled convex glass surface, thereby forming a vehicle windshield having an outer or convex surface including a DLC inclusive coating thereon; and wherein said ion beam depositing is carried out so that a temperature of the curved laminate does not rise above 70 degrees C. during coating depositing on the milled convex glass surface.

2. The method of claim 1, wherein the non-focused ion beam as directed toward the milled convex surface spreads over an angular range α of from about 20 to 45 degrees.

3. The method of claim 2, wherein the non-focused ion beam as directed toward the milled convex surface spreads over an angular range α of from about 30 to 42 degrees.

4. The method of claim 1, wherein said milling comprises ion beam milling substantially an entire surface of the convex surface so as to reduce the thickness thereof by at least about 2 Å (angstroms).

5. The method of claim 4, wherein said ion beam milling is performed in a manner so as to increase scratch resistance (SR) of the coated article by at least a factor of two.

6. The method of claim 4, wherein said ion beam milling is performed in a manner so that an average surface roughness of the ion beam milled surface of the laminate following said ion beam milling is no more than about 80% of what an average surface roughness of the laminate was prior to said ion beam milling.

7. The method of claim 1, wherein said ion beam milling is performed so as to reduce the thickness of the laminate by from about 2–50 Å.

8. The method of claim 1, further comprising using an inert gas in an ion beam source when performing said ion beam milling, so that ions resulting from an inert gas are directed toward the laminate in order to mill the convex surface thereof.

9. The method of claim 1, wherein each of the first and second glass sheets includes a tin side and a non-tin side, and wherein the convex surface of the curved laminate is the tin side of the first sheet so that said ion beam milling mills the tin side of the first sheet of the curved laminate.

10. The method of claim 1, wherein the DLC inclusive coating includes more $sp^3$ carbon—carbon bonds than $sp^2$ carbon—carbon bonds.

11. The method of claim 1, wherein the coated article has an initial contact angle θ of at least about 55 degrees.

12. The method of claim 11, wherein the coated article has an initial contact angle 0 of at least about 80 degrees.

13. The method of claim 1, wherein said ion beam depositing is performed in a manner such that the DLC inclusive coating layer has an average hardness of at least about 20 GPa.

14. The method of claim 1, wherein the vehicle windshield comprises the first and second bent glass sheets with both of (a) the interlayer, and (b) a low-emissivity (low-E) coating, provided therebetween.

15. The method of claim 1, wherein the interlayer comprises a sheet or layer of polyvinyl butyral (PVB).

16. A method of making a curved laminated vehicle windshield, the method comprising:
providing first and second glass sheets;
heat bending the first and second sheets to form respective bent glass sheets;
heating the bent glass sheets with an interlayer therebetween in order to laminate the first and second bent glass sheets to one another via at least the interlayer, thereby forming a curved laminate including an outwardly curved surface; and
ion beam depositing a diamond-like carbon (DLC) inclusive coating directly on the outwardly curved glass surface of the curved laminate thereby forming a vehicle windshield.

17. The method of claim 16, wherein each of the first and second glass sheets includes a tin side and a non-tin side, and wherein the outwardly curved surface of the curved laminate is the tin side of the first bent sheet so that the DLC inclusive coating is ion beam deposited on the tin side of the first sheet of the curved laminate.

18. A method of making a curved laminated vehicle windshield, the method comprising:
providing first and second glass sheets;
heat bending the first and second sheets to form respective bent glass sheets;
heating the bent glass sheets with an interlayer comprising PVB therebetween in order to laminate the first and second bent glass sheets to one another via at least the interlayer, thereby forming a curved laminate including an outwardly curved surface, and allowing cooling of the curved laminate; and
after said cooling, ion beam depositing a diamond-like carbon (DLC) inclusive coating on the outwardly curved surface of the curved laminate thereby forming a vehicle windshield, and wherein a temperature of the curved laminate does not rise above 70 degrees C. from the time that said cooling is complete up until the ion beam depositing is complete.

* * * * *